(12) United States Patent
Creed et al.

(10) Patent No.: US 11,956,130 B1
(45) Date of Patent: Apr. 9, 2024

(54) TARGETED SERVICE LEVEL RESPONSE TIME MANAGEMENT

(71) Applicant: DELL PRODUCTS L.P., Hopkinton, MA (US)

(72) Inventors: John Creed, Innishannon (IE); Arieh Don, Newton, MA (US); John Krasner, Coventry, RI (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/958,550

(22) Filed: Oct. 3, 2022

(51) Int. Cl.
*H04L 41/5009* (2022.01)
*H04L 41/0604* (2022.01)

(52) U.S. Cl.
CPC ...... *H04L 41/5009* (2013.01); *H04L 41/0609* (2013.01)

(58) Field of Classification Search
None
See application file for complete search history.

(56) References Cited

U.S. PATENT DOCUMENTS

| | | | | |
|---|---|---|---|---|
| 9,258,242 B1* | 2/2016 | Mallick | | H04L 43/0888 |
| 9,626,116 B1* | 4/2017 | Martin | | G06F 11/14 |
| 10,146,446 B1* | 12/2018 | Anchi | | G06F 3/0613 |
| 2014/0050087 A1* | 2/2014 | Pasotti | | H04W 28/0252 |
| | | | | 370/230 |
| 2015/0095445 A1* | 4/2015 | Thankappan | | H04L 67/1097 |
| | | | | 709/214 |
| 2020/0249970 A1* | 8/2020 | Sahin | | G06F 9/5077 |
| 2023/0006902 A1* | 1/2023 | Mostov | | H04L 43/16 |

* cited by examiner

*Primary Examiner* — Thu V Nguyen
*Assistant Examiner* — Dae Kim
(74) *Attorney, Agent, or Firm* — Anderson Gorecki LLP

(57) ABSTRACT

The cause of a failure to satisfy a high priority service level objective of a storage object or storage group is localized within a storage array. Storage objects that have been assigned low priority service level objectives are analyzed to determine whether their performance paths overlap with the performance path of the high priority service level objective storage object or storage group at the location of the cause of the failure. The low priority service level objective storage objects having performance paths that overlap with the performance path of the high priority service level objective storage object or storage group at the location of the cause of the failure are targeted for IO data rate reduction in order to free resources to restore compliance with the high priority service level objective. The other low priority service level objective storage objects are not targeted.

11 Claims, 4 Drawing Sheets

TARGETED SERVICE LEVEL RESPONSE TIME MANAGEMENT

TECHNICAL FIELD

The subject matter of this disclosure is generally related to maintaining compliance with service level objectives in a data storage system.

BACKGROUND

Network-attached storage (NAS), Storage Area Networks (SANs), and other types of organizational storage systems can be configured to maintain data on logical storage objects for use by instances of host applications running on host servers. Examples of host applications may include, but are not limited to, multi-user software for email, accounting, inventory control, manufacturing, engineering, and a wide variety of other organizational functions. The storage objects, which are also known as devices, are abstractions of space on physical storage drives. Each storage object includes a contiguous range of logical block addresses (LBAs) at which blocks of host application data can be stored and accessed using input-output commands (IOs) that are processed in the foreground. A single storage array can simultaneously support multiple host applications, each including multiple instances. Separate groups of storage objects are created for each host application, and each host application-specific storage object may be accessed by multiple instances of the associated host application.

Different host applications vary in terms of performance requirements and relative importance to an organization. For example, some host applications are critical to the normal functioning of an organization, whereas other host applications are useful but not critical. Similarly, some host applications require lower latency access to their storage objects than other host applications in order to function properly. In order to accommodate such a variety of requirements and relative importance, it is known for storage systems to implement different service levels that provide performance-differentiated access to data. Performance-differentiated access can be characterized in terms of a response time measured between receipt of an IO by the storage system and completion of processing the IO by the storage system, which is transmission of data to the host server in the case of a read (RD) and transmission of an acknowledgement to the host server in the case of a write (WR). The response time for each service level is sometimes referred to as its service level objective. Service level objectives can be expressed in terms of the maximum permissible response time or latency at the service level, e.g., no greater than X msec for Gold Level service and no greater than Y msec for Silver Level service. A low priority service level objective may correspond to either a relatively longer maximum permissible response time or simply best effort processing based on available resources. A high priority service level objective corresponds to a relatively shorter maximum permissible response time.

It is known to utilize different types of disk drives such as relatively high latency hard disk drives (HDDs) and relatively low latency solid-state drives (SSDs) to create different tiers of storage to help implement different service levels. However, the increasing prevalence of all-flash storage systems has led to the development of performance-differentiated data access based on prioritized IO processing. Different service level objectives are assigned to different storage objects based on the requirements of the host applications that used those storage objects. If a storage system starts to fail to satisfy a high priority service level objective, then the IO rate to low priority service level objective storage objects is intentionally slowed in order to free CPU cycles, memory, access queues, and other resources, thereby providing more resources to decrease the response time for IOs to storage objects assigned high priority service level objectives and restore compliance with the high priority service level objective.

SUMMARY

Some aspects of the present invention are predicated on recognition that decreasing the IO processing rate to storage objects assigned low priority service level objectives in order to restore compliance with high priority service level objectives tends to unnecessarily degrade performance of the storage system. The cause of a failure to satisfy a high priority service level objective can usually be localized to a particular subsystem or storage object in the performance path. That performance path and the problematic subsystem are typically shared with only a subset of the storage objects that are assigned low priority service level objectives. The resources freed by throttling IOs to storage objects that are not members of that subset do little or nothing to help restore compliance with the high priority service level objectives, so storage system performance is unnecessarily degraded.

In accordance with some implementations, a method comprises: detecting a failure to satisfy a service level objective assigned to a device or storage group having a high priority service level objective; identifying low priority service level objective devices with performance paths that overlap the performance path of the high priority service level objective device or storage group; localizing a cause of the failure; targeting at least one of the identified low priority service level objective devices having a performance path that overlaps the performance path of the high priority service level objective device or storage group at the location of the cause of the failure; and reducing input-output (IO) processing rate to the targeted device.

In accordance with some implementations, an apparatus comprises: a plurality of drives; at least one compute node configured to: manage access to the drives; detect a failure to satisfy a service level objective assigned to a device or storage group having a high priority service level objective; identify low priority service level objective devices with performance paths that overlap the performance path of the high priority service level objective device or storage group; localize a cause of the failure; target at least one of the identified low priority service level objective devices having a performance path that overlaps the performance path of the high priority service level objective device or storage group at the location of the cause of the failure; and reduce input-output (IO) processing rate to the targeted device.

In accordance with some implementations, a non-transitory computer-readable storage medium stores instructions that are executed by a storage system to perform a method comprising: detecting a failure to satisfy a service level objective assigned to a device or storage group having a high priority service level objective; identifying low priority service level objective devices with performance paths that overlap the performance path of the high priority service level objective device or storage group; localizing a cause of the failure; targeting at least one of the identified low priority service level objective devices having a performance path that overlaps the performance path of the high priority service level objective device or storage group at the location of the cause of the failure; and reducing input-output (IO) processing rate to the targeted device.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
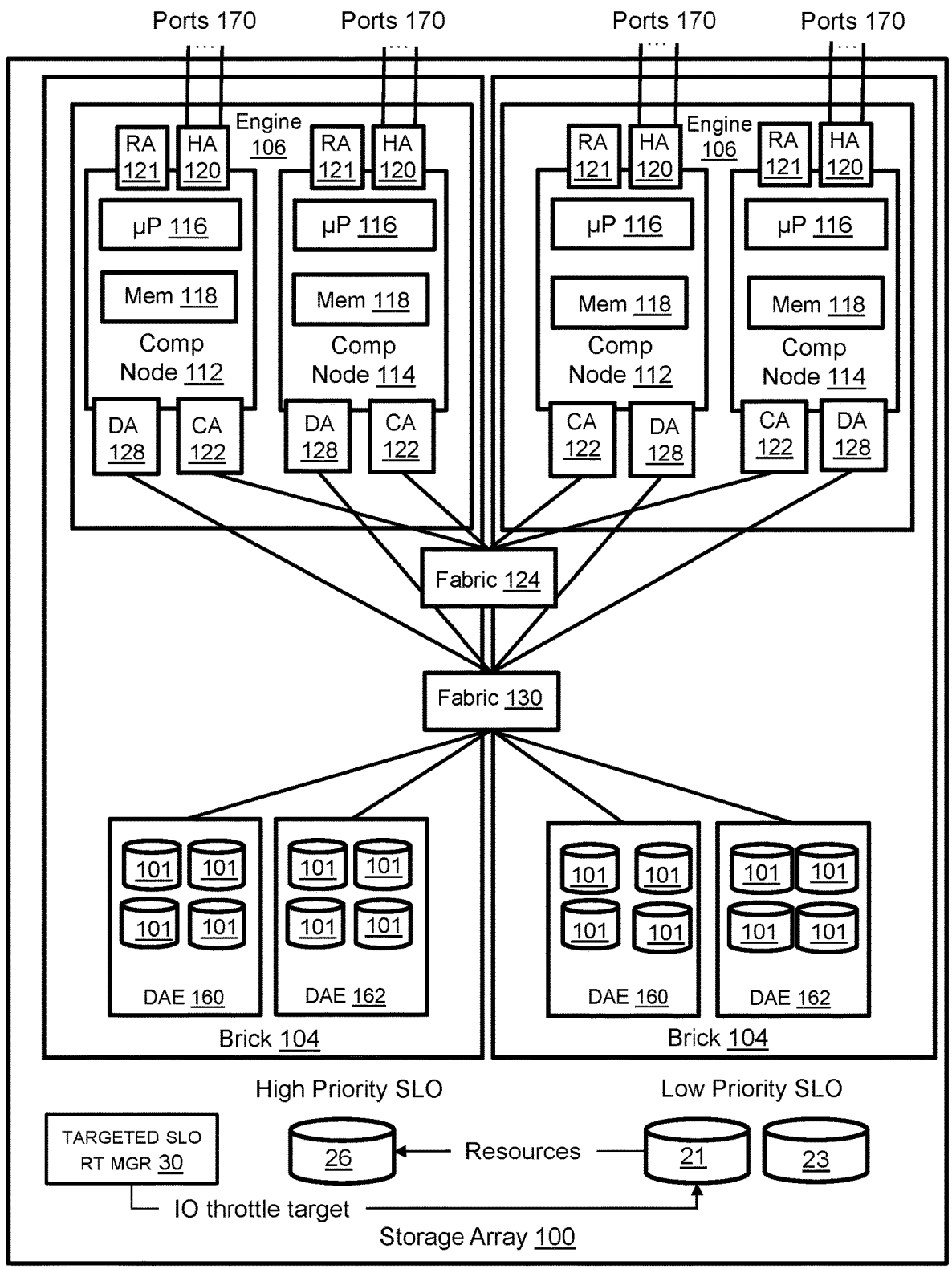
FIG. 1 illustrates a storage system in which a targeted service level objective (SLO) response time manager selects specific storage objects with low priority service level objective for targeted IO throttling to help restore compliance with high priority service level objectives.

FIG. 1 illustrates a storage array 100 in which a targeted service level objective (SLO) response time (RT) manager 30 selects specific storage objects for targeted IO throttling to help restore compliance with high priority service level objectives. For example, following detection of failure to satisfy a high priority service level objective assigned to storage object 26, the SLO RT manager 30 localizes the cause of the problem in the performance path of storage object 26 and determines that the performance path of low priority service level objective storage object 21 overlaps the performance path of storage object 26 at the location of the fault, but low priority service level objective storage object 23 does not have a performance path that overlaps the performance path of storage object 26 at the location of the fault. Based on those determinations, the SLO RT manager 30 targets storage object 21 for reduced IO rate and does not target storage object 23 for reduced IO rate. This frees resources to help restore compliance with the high priority service level objective assigned to storage object 26 without needlessly slowing access to storage object 23.

The storage array 100 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 112, 114 that are arranged as a memory-mirrored pair for failover and may be referred to as "storage directors." Although it is known in the art to refer to the compute nodes of a SAN as "hosts," that naming convention is avoided in this disclosure to help distinguish the host servers from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has multiple ports 170 for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. The SLO RT manager 30 runs on one or more of the compute nodes 112, 114. The features described above are examples of subsystems to which a problem that causes failure to satisfy a high priority service level objective can be localized.

Figure 2:
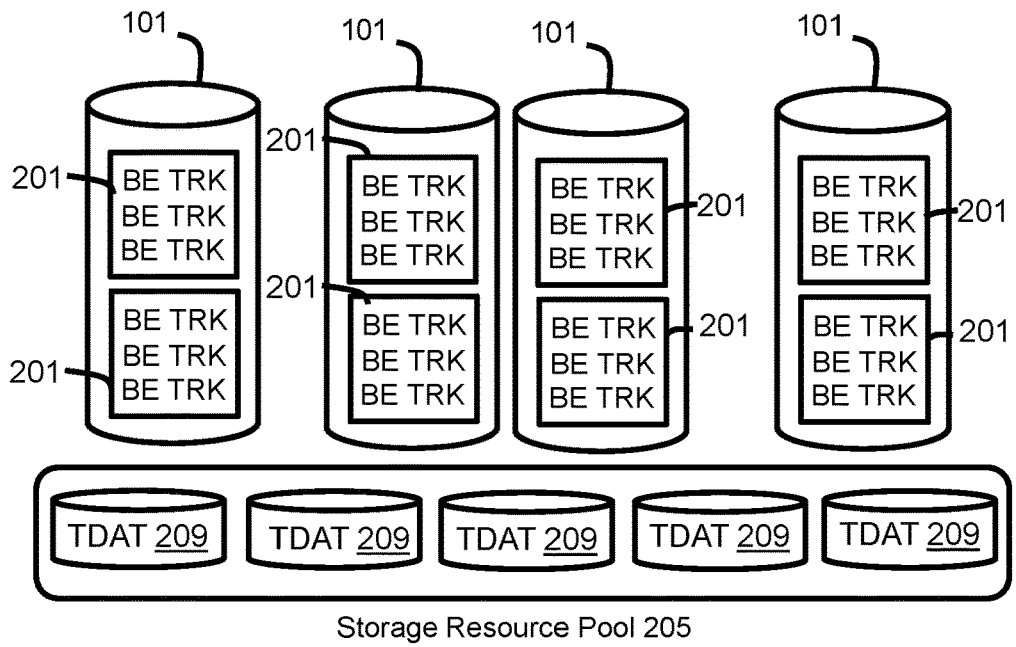
FIG. 2 illustrates storage objects at various layers of abstraction between the managed drives and application-specific storage groups.
Figure 2:
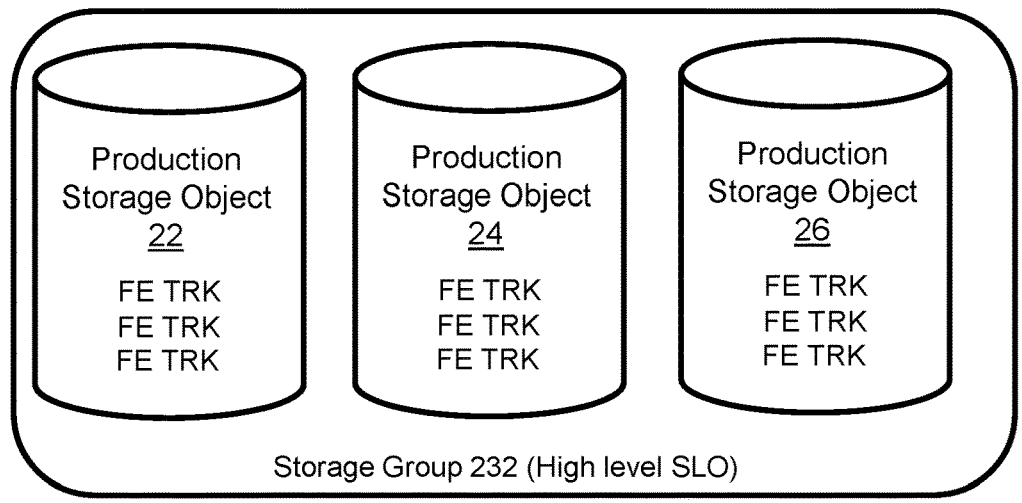
Figure 2:
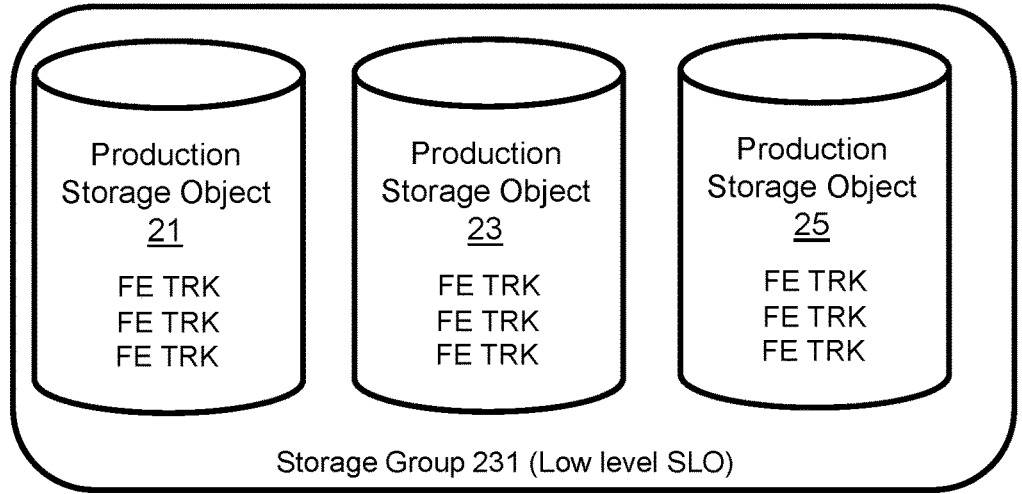

Referring to FIG. 2, the storage array maintains a variety of storage objects at intermediate levels of abstraction between the managed drives 101 and production storage objects 21, 22, 23, 24, 25, 26 that can be discovered and accessed by host servers. The basic allocation unit of storage capacity that is used by the compute nodes to access the managed drives 101 is a back-end track (BE TRK). The managed drives may be configured with subdivisions 201, each of which may contain multiple BE TRKs. Groupings of subdivisions from different managed drives are used to create RAID protection groups. A storage resource pool 205, also known as a thin pool, is a grouping of storage objects known as thin data devices (TDATs) 209 that contain RAID protection groups of the same type. Storage resource pools are used to create production storage objects 21, 22, 23, 24, 25, 26, also known as thin devices (TDEVs). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory. Storage groups 231, 232 are groupings of production storage objects used by instances of only one host application. Storage objects and groupings are examples of features to which failure to satisfy a high priority service level objective can be localized.

Figure 3:
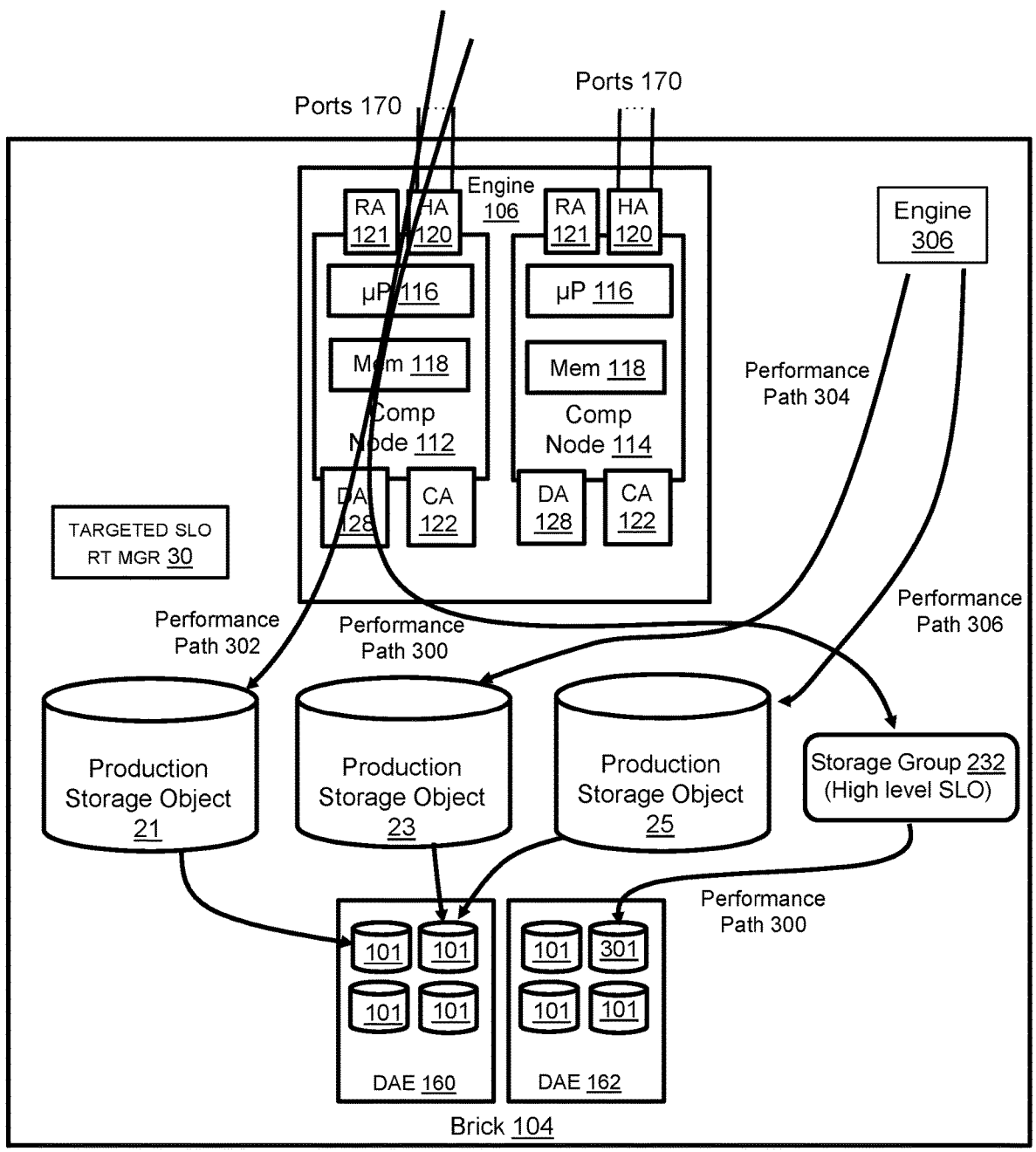
FIG. 3 illustrates selection of a storage object for targeted IO throttling.

FIG. 3 illustrates selection of a storage object for targeted IO throttling. In the illustrated example, the storage objects in storage group 232 are assigned a high priority service level objective that the storage array fails to satisfy due to a fault. The SLO RT manager 30 detects the failure to satisfy the high priority service level objective and, in response, identifies the performance path 300 associated with storage group 232. The performance path of a storage object may be defined by the subsystems and links traversed between an input port and managed drive to process IOs to that storage object. The SLO RT manager 30 also identifies the performance paths 302, 304, 306 associated with production storage objects 21, 23, 25, each of which is assigned a low priority service level objective. The SLO RT manager 30 determines that performance path 302 overlaps performance path 300 at compute node 112 of engine 106, including ports 170, HA 120, processor 116, memory 118, and DA 128. Performance paths 304, 306, associated respectively with storage objects 23, 25, use a different engine 306 and do not overlap performance path 300. The SLO RT manager 30 localizes the fault and, if the fault is in the overlapping portion of the performance paths 300, 302, targets storage object 21 for reduced IO rate. For example, if the fault is the HA 120 of engine 106 which is in the overlapping portion of the performance paths, then reducing the rate of IOs to storage object 21 will lower the response time of IOs that access storage group 232. In contrast, if the fault is managed drive 301, which is not used by storage object 21, then reducing the rate of IOs to storage object 21 will not lower the response time of IOs that access storage group 232.

Figure 4:
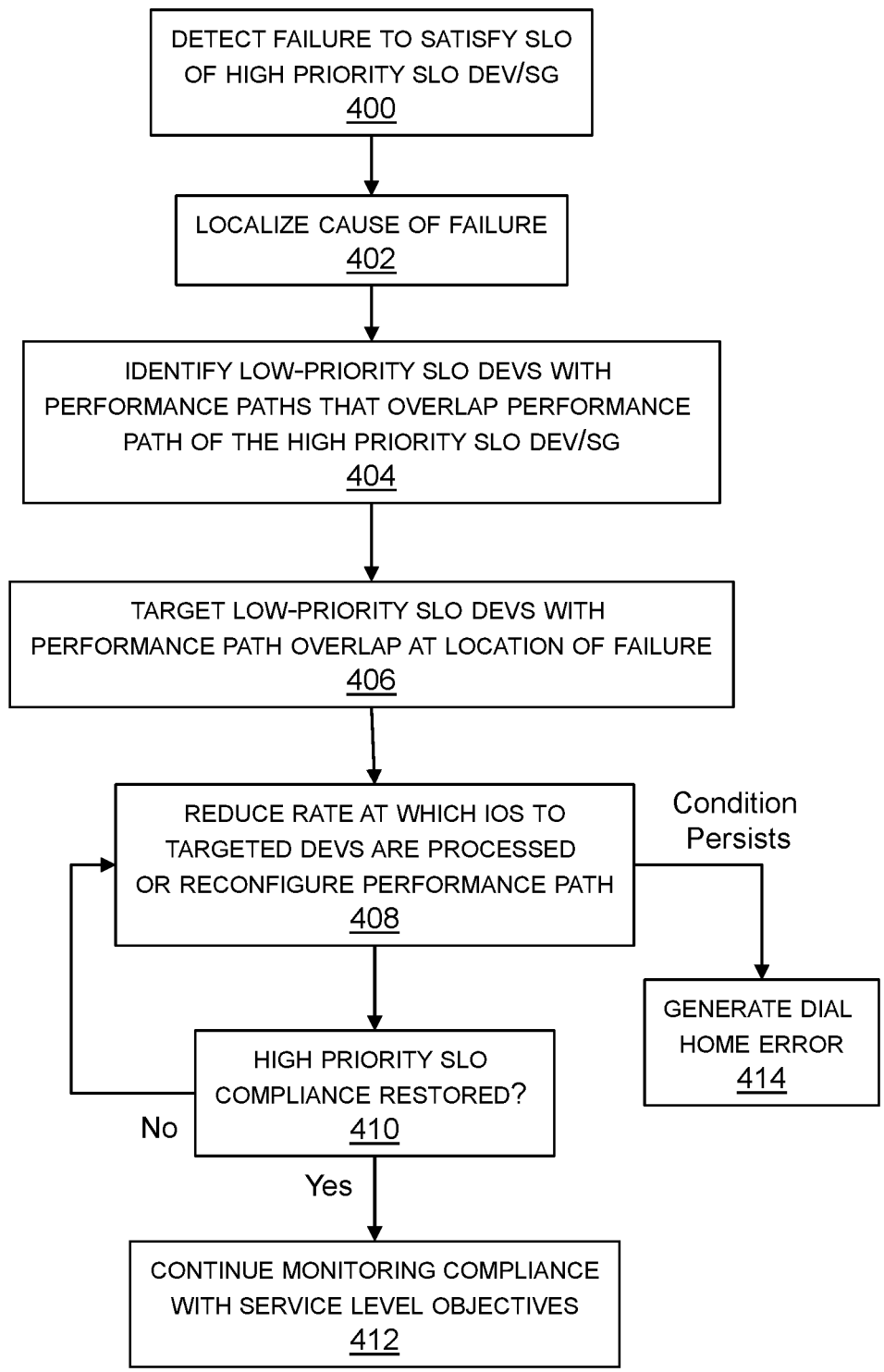
FIG. 4 illustrates a method for implementing targeted IO throttling to help restore compliance with high priority service level objectives.

FIG. 4 illustrates a method for implementing targeted IO throttling to help meet high priority service level objectives. Step 400 is detecting a failure to satisfy the service level objective assigned to a device (storage object) or storage group having a high priority service level objective. A high priority service level objective may be defined as a design choice or simply be a service level with a shorter service level objective than the low priority service level objective, e.g., with better than best efforts service. Step 402 is localizing the cause of the failure. The problem can be localized to a subsystem, storage object, or other feature. Step 404 is identifying low priority service level objective devices with performance paths that overlap the performance path of the high priority service level objective device or storage group for which the SLO is not satisfied, i.e., the device or storage group in step 400. A low priority service level objective may be defined as a design choice or simply be a service level with a longer service level objective than the high priority service level objective or no service level objective, e.g., best efforts service. Step 406 is targeting the low priority service level objective storage objects characterized by performance path overlap with the high priority service level objective storage object or storage group at the location of the problem. Step 408 is reducing the rate of IOs to the targeted storage objects. The IO rate reduction may be in a predetermined fixed increment. Associated IOs may be buffered in shared memory and communication with the host servers may slow the rate of IO transmission to the storage array. Alternatively, or additionally, the performance path of the high priority service level objective storage object or storage group may be reconfigured or rerouted around the localized failure. Step 410 is determining whether compliance with the high priority service level objective has been restored. If compliance with the high priority service level objective has not been restored, then flow returns to step 408 and the rate of IOs to the targeted storage objects is further reduced. If compliance with the high priority service level objective has been restored, then compliance with service level objectives is monitored in step 412. A predetermined number of iterations of steps 408, 410, or passage of a predetermined period of time without restoration of compliance, is indicative of a persistent condition that triggers generation of a dial home error in step 414. The dial home error prompts intervention by a storage administrator.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
   detecting a failure to satisfy a service level objective assigned to a device or storage group having a high priority service level objective;
   identifying low priority service level objective devices with individual performance paths that only partially overlap an individual performance path of the high priority service level objective device or storage group by traversing a common engine that comprises paired compute nodes with microprocessors and physical memory components and not intersecting elsewhere;
localizing a cause of the failure to an electronic hardware subsystem of the common engine, the electronic hardware subsystem being one part of a plurality of electronic hardware parts of the performance path of the high priority service level objective device or storage group;
targeting at least one of the identified low priority service level objective devices having a performance path that overlaps the performance path of the high priority service level objective device or storage group at the location of the electronic hardware part to which the cause of the failure is localized;
reducing input-output (IO) processing rate to the targeted device;
determining that compliance with the service level objective assigned to the device or storage group having the high priority service level objective has not been restored by reducing the IO processing rate to the targeted device;
further reducing the IO processing rate to the targeted devices in response to determining that compliance with the service level objective assigned to the device or storage group having a high priority service level objective has not been restored; and
generating an error message responsive to determining that compliance with the service level objective assigned to the device or storage group having a high priority service level objective has not been restored after a predetermined number of reductions of IO processing rate to the targeted devices.

2. The method of claim 1 further comprising reconfiguring the performance path of the high priority service level objective device or storage group to avoid the cause of the failure.

3. The method of claim 1 further comprising localizing the cause of the failure to a compute node of the common engine.

4. The method of claim 1 further comprising targeting all identified low priority service level objective devices having a performance path that only partially overlaps the performance path of the high priority service level objective device or storage group at the location of the cause of the failure and reducing IO processing rate to all targeted devices.

5. An apparatus comprising:
a plurality of drives;
at least one compute node configured to:
  manage access to the drives;
  detect a failure to satisfy a service level objective assigned to a device or storage group having a high priority service level objective;
  identify low priority service level objective devices with individual performance paths that only partially overlap an individual performance path of the high priority service level objective device or storage group by traversing a common engine that comprises paired compute nodes with microprocessors and physical memory components and not intersecting elsewhere;
  localize a cause of the failure to an electronic hardware subsystem of the common engine, the electronic hardware subsystem being one part of a plurality of parts of the performance path of the high priority service level objective device or storage group;
  target at least one of the identified low priority service level objective devices having a performance path that overlaps the performance path of the high priority service level objective device or storage group at the location of the electronic hardware part to which the cause of the failure is localized;
  reduce input-output (IO) processing rate to the targeted device;
  determine that compliance with the service level objective assigned to the device or storage group having the high priority service level objective has not been restored by reducing the IO processing rate to the targeted device;
  further reduce the IO processing rate to the targeted devices in response to determining that compliance with the service level objective assigned to the device or storage group having a high priority service level objective has not been restored; and
  generate an error message responsive to determining that compliance with the service level objective assigned to the device or storage group having a high priority service level objective has not been restored after a predetermined number of reductions of TO processing rate to the targeted devices.

6. The apparatus of claim 5 further comprising the at least one compute node configured to reconfigure the performance path of the high priority service level objective device or storage group to avoid the cause of the failure.

7. The apparatus of claim 5 further comprising the at least one compute node configured to localize the cause of the failure to a compute node.

8. The apparatus of claim 5 further comprising the at least one compute node configured to target all identified low priority service level objective devices having a performance path that only partially overlaps the performance path of the high priority service level objective device or storage group at the location of the cause of the failure and reducing TO processing rate to all targeted devices.

9. A non-transitory computer-readable storage medium storing instructions that are executed by a storage system to perform a method comprising:
detecting a failure to satisfy a service level objective assigned to a device or storage group having a high priority service level objective;
identifying low priority service level objective devices with individual performance paths that only partially overlap an individual performance path of the high priority service level objective device or storage group by traversing a common engine that comprises paired compute nodes with microprocessors and physical memory components and not intersecting elsewhere;
localizing a cause of the failure to an electronic hardware subsystem of the common engine, the electronic hardware subsystem being one part of a plurality of electronic hardware parts of the performance path of the high priority service level objective device or storage group;
targeting at least one of the identified low priority service level objective devices having a performance path that overlaps the performance path of the high priority service level objective device or storage group at the location of the electronic hardware part to which the cause of the failure is localized;
reducing input-output (IO) processing rate to the targeted device;
determining that compliance with the service level objective assigned to the device or storage group having the high priority service level objective has not been restored by reducing the IO processing rate to the targeted device;

further reducing the IO processing rate to the targeted devices in response to determining that compliance with the service level objective assigned to the device or storage group having a high priority service level objective has not been restored; and generating an error message responsive to determining that compliance with the service level objective assigned to the device or storage group having a high priority service level objective has not been restored after a predetermined number of reductions of IO processing rate to the targeted devices.

10. The non-transitory computer-readable storage medium of claim 9 in which the method further comprises reconfiguring the performance path of the high priority service level objective device or storage group to avoid the cause of the failure.

11. The non-transitory computer-readable storage medium of claim 9 in which the method further comprises localizing the cause of the failure to a compute node.

\* \* \* \* \*